INVENTOR.
FRANK PISCIOTTA
BY Raymond R. Skolnick

United States Patent Office 3,355,951
Patented Dec. 5, 1967

3,355,951
CONCAVE DISK ACCELERATION INTEGRATOR
Frank Pisciotta, West Hempstead, N.Y., assignor to Sperry Rand Corporation, Ford Instrument Company Division, Long Island City, N.Y., a corporation of Delaware
Filed Aug. 24, 1964, Ser. No. 391,587
11 Claims. (Cl. 73—503)

This invention relates to accelerometers in general and more particularly to a mechanical acceleration integrator so constructed that its inertia mass is mounted for return to a self-centering zero position.

U.S. Patent 3,029,645 describes a mechanical integrator employing a disk, two idler balls and a roller with these elements being assembled in an arrangement such that the roller lies in a vertical plane which includes the shaft axis of the disk and in a horizontal plane parallel to the face of the disk. The two idler balls are disposed in the vertical plane contacting one another with one ball in contact with the disk and the other ball in contact with the roller. The disk is rotated at a constant speed and at any time when the ball contact point with the disk is not at the center of the disk, rotation will be imparted to the roller with roller speed being a function of the radius of the ball contact point from the center of the disk. A carriage provided for the balls serves as the mass of a spring-mass system movable along the measuring axis responsive to acceleration forces along this axis.

This conventional construction has presented certain practical problems, primarily as a result of the difficulty in adjusting the springs of the spring-mass system for return of the inertia mass exactly to zero position in the absence of an acceleration force. In order to overcome this difficulty the instant invention provides a device in which the inertia mass is not part of a spring-mass system.

This is achieved by providing the rotating disk with a concave surface upon which the inertia mass, including the balls, rides with the disk being spring loaded toward the inertia mass. In this construction the position of the inertia mass is determined by the equilibrium of forces accompanying acceleration and by the pressure between the spring loaded concave disk and the balls of the inertia mass. As will hereinafter become apparent, the device is so constructed that the inertia mass is biased toward a self-centering zero position determined at the center of the concave disk. Sensitivity adjustment is readily accomplished either by trimming the inertia mass or by adjusting the force acting along the rotational axis of the disk.

Accordingly, a primary object of the instant invention is to provide a novel mechanical accelerometer which does not require a spring-mass system.

Another object is to provide a novel mechanical accelerometer including means for returning the inertia mass to a self-centering zero position.

Still another object is to provide a novel construction for a mechanical integrating accelerometer having a rotating time disk.

A further object is to provide a novel accelerometer in which biasing means acting directly on the guide-way member for the inertia mass urges the mass toward zero position.

These as well as other objects of the instant invention shall become readily apparent after reading the following description of the accompanying drawings in which.

Figure 1:
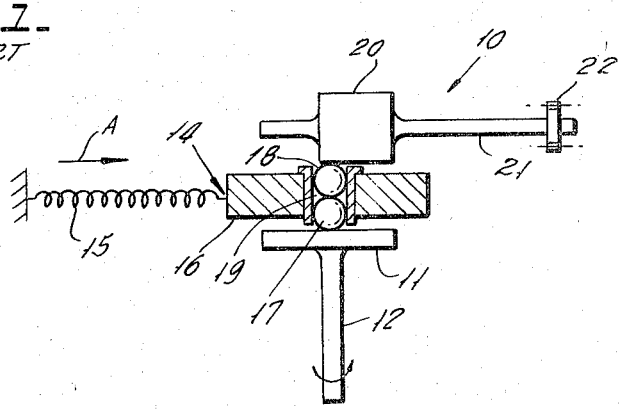
FIGURE 1 is a schematic illustrating the construction of a mechanical integrating accelerometer of the type illustrated in U.S. Patent 3,029,645.

Now referring to the figures and more particularly to FIGURE 1. Mechanical integrating accelerometer 10, of the type described in detail in U.S. Patent 3,029,645, includes integrating disk 11 mounted for rotation on shaft 12 at a constant speed by means not shown. Spring-mass system 14 includes tension spring 15, carriage 16 and integrating balls 17, 18. Spring 15 extends between the device frame and carriage 16 while balls 17, 18 are mounted in a bore 19 of carriage 16. Ball 17 extends from bore 19 and contacts the upper surface of disk 11 while ball 18 extends above the upper end of bore 19 and contacts the periphery of integrator roller 20. The latter is mounted on shaft 21 which is mounted for rotation in bearing 22 and is positioned at right angles on disk shaft 12.

A means not shown applies pressure between disk 11, balls 17, 18 and roller 20 so that rotational motion of disk 11 may be frictionally transmitted to roller 20 through coupling means constituted by balls 17, 18.

When the point of contact between ball 17 and the upper surface of disk 11 is along the rotational axis of shaft 12, spring-mass system 14 is at its zero position and even though shaft 12 is rotating, shaft 21 is stopped. As soon as spring-mass system 14 is displaced from this zero position along measuring axis A, rotation of disk 11 is coupled through balls 17, 18 to rotate roller 20 which in turn causes rotation of shaft 21 which is part of a readout system. Naturally, the greater the displacement of spring-mass system 14 from its zero position the greater will be the speed of rotation of shaft 21.

Spring 15 has been found to present certain practical difficulties in the construction illustrated in FIGURE 1. That is, spring 15 has been difficult to mount and adjust, must be very precise if accelerometer 10 is to give accurate indications. Non-linearity and hysteresis effects of spring 15 have also adversely affected accuracy.

In the construction of accelerometer 30 (FIGURE 2) all springs have been eliminated from direct action upon the inertia mass resulting in a less expensive and more accurate unit. Integrating accelerometer 30 includes integrator disk 31 mounted for constant speed rotation on shaft 41 by means not shown. Inertia mass 32 is comprised of carriage 35 and integrator balls 33, 34 mounted in carriage bore 36. Ball 34 extends beyond the upper confines of bore 36 into engagement with integrator roller 37 carried by shaft 38 which is mounted for rotation in bearing 39. Ball 33 extends beyond the lower confines of bore 36 and rests upon the concave upper surface 40 of disk 31. Biasing means 42, such as a common tension or compression spring for varying pressure and a Negator spring or fluid pressure device for constant pressure, exerts force P at right angles to measuring axis B and along the rotational axis of shaft 32. The pressure exerted by means 42 urges concave disk 31 against integrator ball 33 and in turn urges integrator ball 34 against roller 37.

Accelerometer 30 functions in the same manner as accelerometer 10 excepts that the position of inertia mass 32 is determined by a biasing force acting on integrator disk 31 rather than a biasing force along the measuring axis. The shape of concave surface 40 is determined by the characteristics of biasing means 42 and the desired output characteristics of accelerometer 30.

Figure 3:
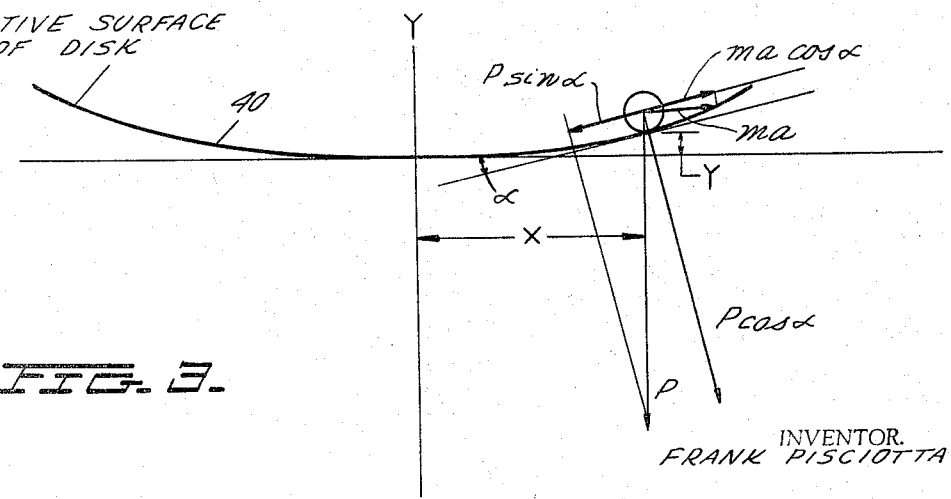
FIGURE 3 is a diagram illustrating the parameters utilized to mathematically establish the validity of the construction illustrated in FIGURE 2.

Reference is made to FIGURE 3 for an illustration of the symbols utilized in the following mathematical derivation showing the shape of surface 40 under two different conditions. For case I the force P holding disk 31 against integrating ball 33 is constant while in case II the force P is due to a regular compression spring and as a result increases as inertia mass 32 is displaced from the zero position.

Symbols:

$m$ = inertia mass 32 (carriage 35 and balls 33, 34);
$a$ = acceleration being measured;
$P$ = force between disk 31 and roller 37, through balls 33, 34;
$X$ = displacement of inertia mass 32;
$Y$ = disk's displacement, in the direction of its shaft axis, when the inertia mass 32 has a displacement X;
$K_1 K_2$ = constants of proportionality;
$K_s$ = rate of compression spring;
$P_o$ = force exerted by compression spring when the device is at rest (zero acceleration). Used for Case II only.
$\alpha$ = angle between the tangent to the disk profile 40 and the displacement direction at the point of contact.

*Case I*

$$P = \text{constant}$$

The acceleration force tends to displace the inertia mass 33–35 so that ball 33 tends to "climb" over the curved surface 40 of the concave disk 31, while the pressure exerted by the disk 31 opposes this motion.

Equilibrium is achieved, if the friction is negligible, when (see FIG. 3)

(1) $$ma \cos \alpha = P \sin \alpha$$

from which the acceleration is obtained (2) $$a = \frac{P}{m} \tan \alpha$$

If the profile of the disk's curve is machined in such a manner that (3) $$\tan \alpha = K_1 X$$

where $K_1$ is a constant of proportionality, it can be seen from Equations 2 and 3, that the acceleration is proportional to the displacement X of inertia mass 32.

(4) $$a = \frac{P}{m} K_1 X$$

and therefore is measured by the value of this displacement multiplied by the constant $$\frac{P}{m} K_1$$

In order to obtain the proportionality between tan $\alpha$ and the displacement of inertia mass 32, the cross-sectional profile of disk 31 must be a parabola, as can be seen from the following derivation:

$$\tan \alpha = \frac{dY}{dX} = K_1 X$$

Integrating this equation we obtain:

(5) $$Y = \frac{K_1}{2} X^2 + C$$

which is the equation of a parabola. (The constant C of integration is zero if the vertex of the parabola coincides with the origin of the coordinates.) For Case I the entire surface 40 is therefore a paraboloid of revolution.

*Case II*

The force P is due to a compression spring, which exerts a force $P_o$ when the device is at rest, and a further force $K_x Y$ when the inertia mass 32 is displaced of X. Therefore (6) $$P = P_o + K_s Y$$

Figure 2:
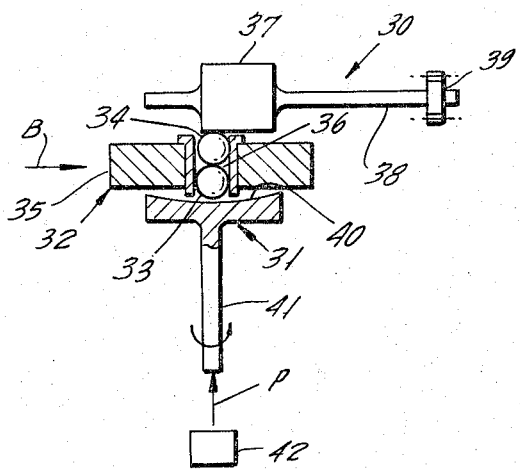
FIGURE 2 is a schematic illustrating a mechanical integrating accelerometer constructed in accordance with the teachings of the instant invention.

Again equilibrium is achieved when (see FIG. 2)

(1) $$ma \cos \alpha = P \sin \alpha$$

from which

2) $$a = \frac{P}{m} \tan \alpha$$

If the profile of the disk's curve is machined in such a manner that (7) $$P \tan \alpha = K_2 X$$

from (2) and (7) we obtain (8) $$a = \frac{1}{m} K_2 X$$

which shows that the acceleration is proportional to the displacement of the inertia mass 32, the factor $K_2/m$ being the constant of proportionality.

In order to obtain this proportionality, the cross-sectional profile of the disk 31 must be hyperbola, as can be seen by integrating Equation 7, as follows:

(7) $$P \tan \alpha = K_2 X$$

Using Equation 6 and the identity $$\tan \alpha = \frac{dY}{dX}$$

(9) $$(P_o + K_s Y) \frac{dY}{dX} = K_2 X$$

(10) $$P_o \frac{dY}{dX} + K_s Y \frac{dY}{dX} = K_2 X$$

(11) $$P_o \int dY + K_s \int Y dY = K_2 \int X dX$$

(12) $$P_o Y + K_s \frac{Y^2}{2} = K_2 \frac{X^2}{2} + C$$

(The constant C of integration is zero if the vertex of the curve coincides with the origin of the coordinates.)

Equation 12 is the equation of a hyperbola since its discriminant $$-\frac{K_2}{2} \frac{K_s}{2} - 0 = -\frac{K_2 K_s}{4}$$

is negative.

For Case II the entire surface 40 of the disk 31 is therefore a hyperboloid of revolution.

By utilizing the geometric shapes derived above for the concave or guide surface of disk 31, a linear device is obtained. Any other suitably shaped surface and/or biasing may be employed in combination to obtain a non-linear device.

It should now be obvious to those skilled in the art that the principle above described for establishing the position of the acceleration sensitive mass can also be applied to a linear mass accelerometer without an integrating feature. In the latter case, instead of a disk guide, a spring-loaded concave guide should be utilized.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows.

1. An accelerometer of the class described comprising a disk mounted for rotation about a first axis, a readout means, an inertia mass including coupling means for transmitting motion from said disk to said readout means, biasing means exerting a force directed parallel to said first axis and urging said coupling means and said disk into frictional engagement; said disk having a concave surface in contact with said coupling means; said concave surface being positioned such that a component of force derived from said biasing means urges said coupling means to contact said surface at a zero point coincident with said first axis.

2. An accelerometer as set forth in claim 1 in which said concave surface is a paraboloid of revolution.

3. An accelerometer as set forth in claim 2 in which said biasing means exerts a constant force for all positions of said mass while said coupling means remains in contact with said concave surface.

4. An accelerometer as set forth in claim 1 in which said concave surface is a hyperboloid of revolution.

5. An accelerometer as set forth in claim 4 in which said biasing means exerts a force which increases as said coupling means moves away from said zero point.

6. An accelerometer of the class described comprising a disk mounted for rotation about a first axis, a roller mounted in spaced relation from said disk for rotation about a second axis in a plane perpendicular to said first axis, an inertia mass including coupling means for transmitting motion from said disk to said roller, biasing means exerting a force directed parallel to said first axis and urging said coupling means into frictional engagement with said disk and said roller; said disk having a concave surface in contact with said coupling means; said concave surface being positioned such that a component of force derived from said biasing means urges said coupling means to contact said surface at a zero point coincident with said first axis.

7. An accelerometer as set forth in claim 6 in which said concave surface is a paraboloid of revolution.

8. An accelerometer as set forth in claim 7 in which said biasing means exerts a constant force for all positions of said mass while said coupling means remains in contact with said concave surface.

9. An accelerometer as set for in claim 6 in which said concave surface is a hyperboloid of revolution.

10. An accelerometer as set forth in claim 9 in which said biasing means exerts a force which increases as said coupling means moves away from said zero point.

11. An accelerometer as set forth in claim 6 in which the coupling means includes a pair of contacting balls mounted along a line parallel to said first axis with one of said balls in contact with said concave surface and the other of said balls in contact with the periphery of said roller.

References Cited

UNITED STATES PATENTS

| | | | |
|---|---|---|---|
| 2,258,539 | 10/1941 | Cosner | 200—61.45 |
| 2,297,435 | 9/1942 | Schwager | 235—61 |
| 2,953,933 | 9/1960 | Kashiwara | 74—194 |
| 3,029,645 | 4/1962 | Kallenberg et al. | 73—503 |
| 3,164,983 | 1/1965 | Perkins et al. | 73—517 X |

JAMES J. GILL, *Primary Examiner.*